United States Patent [19]
Vicory

[11] Patent Number: 5,796,908
[45] Date of Patent: Aug. 18, 1998

[54] OPTICAL FIBER ORGANIZING TRAY

[75] Inventor: William Anthony Vicory, Suwanee County, Ga.

[73] Assignee: Lucent Technologies Inc., Murray Hill, N.J.

[21] Appl. No.: 712,504

[22] Filed: Sep. 11, 1996

[51] Int. Cl.⁶ .................................................. G02B 6/00
[52] U.S. Cl. .................................... 385/135; 385/137
[58] Field of Search ................................. 385/135, 136, 385/137, 138, 139

[56] References Cited

U.S. PATENT DOCUMENTS

| | | |
|---|---|---|
| 4,754,876 | 7/1988 | Noon et al. ........................ 206/334 |
| 5,071,211 | 12/1991 | Debortoli et al. .................. 385/135 X |
| 5,074,635 | 12/1991 | Justice et al. ..................... 385/135 X |
| 5,115,489 | 5/1992 | Norris ................................ 385/135 |
| 5,285,515 | 2/1994 | Milanowski et al. ............. 385/135 |
| 5,519,804 | 5/1996 | Burek et al. ....................... 385/135 |
| 5,553,183 | 9/1996 | Bechamps ...................... 385/135 X |

*Primary Examiner*—Phan T.H. Palmer

[57] ABSTRACT

An optical fiber organizing tray for holding and protecting optical fibers and modular components connected thereto and adapted to be mounted in an enclosure, is symmetrical about both longitudinal and transverse axes. The tray has a centrally located hub member about which fibers are to be wound extending from a substantially planar floor. A peripheral wall extends about the floor member, spaced from the hub member and has spaced keeper bars extending from the wall on one side of the floor to the wall on the other side of the floor. First and second pairs of spaced walls extending higher than the peripheral wall and spaced from the hub member provide storage space for the modular components.

14 Claims, 4 Drawing Sheets

OPTICAL FIBER ORGANIZING TRAY

FIELD OF INVENTION

This invention relates to optical fiber organizing trays and, more particularly, to an organizing tray for use with a splitter module housing.

BACKGROUND OF THE INVENTION

In metallic wire communication practices, various functional closures are used wherein the wires and accompanying components, such as splices, are contained, stored, and protected. Because of the innate strength of metallic wire, it can be sharply bent to meet space limitations, and slack wire within the enclosure may be tightly coiled. Glass optical fibers, on the other hand, are of extremely small diameter and are relatively fragile, therefore, optical fibers must be treated more carefully in placing them and their components, such as splitters or splices, within an enclosure. Transmission capability of the fiber may be impaired if the fiber is bent to less than an allowable bending radius to the point where the transmitted light is no longer completely contained within the fiber. In addition, the fibers are brittle and do not possess the strength and resistance to breakage that metallic wire does, hence, when bent too sharply, the fibers may crack or break. The breakage problem is exacerbated by minute, even microscopic surface fractures which are vulnerable to stresses on the fiber. Glass fibers cannot be twisted, tied or tightly coiled in the same manner as individual wires, nor can they be crimped or tightly bent. Thus, within any confined enclosure, provision must be made for ample fiber slack to obviate sharp bends, thereby placing stringent demands on the enclosure.

It is generally the practice in the prior art, as exemplified by the disclosure of U.S. Pat. Nos. 5,115,489 of Norris, and 5,519,804 of Burek, et al., to use trays for organizing and holding the fibers and their accompanying splice or splitter components, for example. A typical tray has one or more hubs about which the fibers, more particularly, the slack of the fibers, can be wound. The diameter of the hub is such that the radius of curvature of the fiber wound thereabout is not less than a critical minimum, thereby insuring the fiber against breakage due to too sharp a bend. The trays also usually have a space or spaces for containment of one or more types of components, such as splices or splitters. A tray generally has tabs or fingers extending across a portion of the open space thereof to hold the fibers within the enclosed volume of the tray. In most cases, such as in the aforementioned Burek et al. patent, which is directed primarily to a splice tray, the trays are stackable within the enclosure. Stacked trays make it possible to accommodate large numbers of fibers and modules, but suffer the disadvantage of difficulty of access to any specific tray other than the one on top of the stack. Thus, a break, malfunction, or other fault within one of the lower trays can usually only be reached by unstacking the trays until the desired one is exposed. This can be extremely time consuming and uneconomical, and increases the risks of fiber damage due to too much moving or manipulation.

One type of fiber optic enclosure commonly used is a splitter module housing. A typical splitter module housing comprises a rectangular box having one or more organizing trays mounted thereon, and one or more connector panels mounted on one end of the box, each panel having a plurality of connector ports. A typical installation would be three panels, each having a total of seven connector ports, and three organizing trays stacked within the enclosure. Each organizing tray is capable of containing seven components, for example, thus where each port is connected to a fiber whose signal is to be split, a total of three trays, stacked on top of each other, is required. The space for containing the components is limited, and most often has a lid or cap for enclosing the modules to facilitate stacking, for example. As pointed out hereinbefore, stacking is, at best, a time consuming feature, especially where accessibility of particular fibers is minimal.

SUMMARY OF THE INVENTION

The present invention is a fiber organizer tray for use with a splitter module housing. While the tray of the invention may be used with other types of fiber components, such as splices, it is shown in a preferred embodiment as used within splitters.

The tray comprises a base member of suitable material having a substantially planar floor and an upstanding wall of a first height extending around the periphery thereof. Substantially centrally located on the base member is a hub member having curved ends whose radius of curvature is greater than the critical bending radius of the fiber to be wound thereabout. Extending through the hub member at either end thereof are first and second mounting bores for receiving a mounting screw for mounting the tray in the enclosure. The bores are located on opposite sides of both the longitudinal and traverse centerlines of the tray and of the hub, thereby imparting a symmetry to the tray which permits either end of the tray to be inserted into the enclosure while insuring that one of the mounting bores will be aligned with a mounting hole in the floor of the enclosure. On each side of the hub are first and second spaced, upstanding walls, each wall extending to a height greater than that of the first wall, each pair of walls forming a receiving space for one or more components. The walls are sufficiently high that the storage spaces created thereby are each capable of holding sixteen or even more components.

Extending across the tray from one side wall to the other are first and second keeper bars, spaced from the floor of the tray and affixed at each end to the peripheral wall. Each keeper bar is located approximately mid-way between one end wall of the tray and the module containing space, and functions to contain the fibers that are wound around the hub. The keeper bars represent an improvement over the tabs or fingers of the prior art inasmuch as the fiber loops can simply be slid under the bars and are subsequently retained in place thereby. With the bars, the tedious operation of inserting each fiber under each tab is obviated, plus the fact that the keeper bars perform as well as, or better than, the tabs at retaining the loose fibers within the tray.

The principles of the invention and the numerous features thereof will be more readily apparent from the following detailed description, read in conjunction with the accompanying drawings.

3

Figure 5:
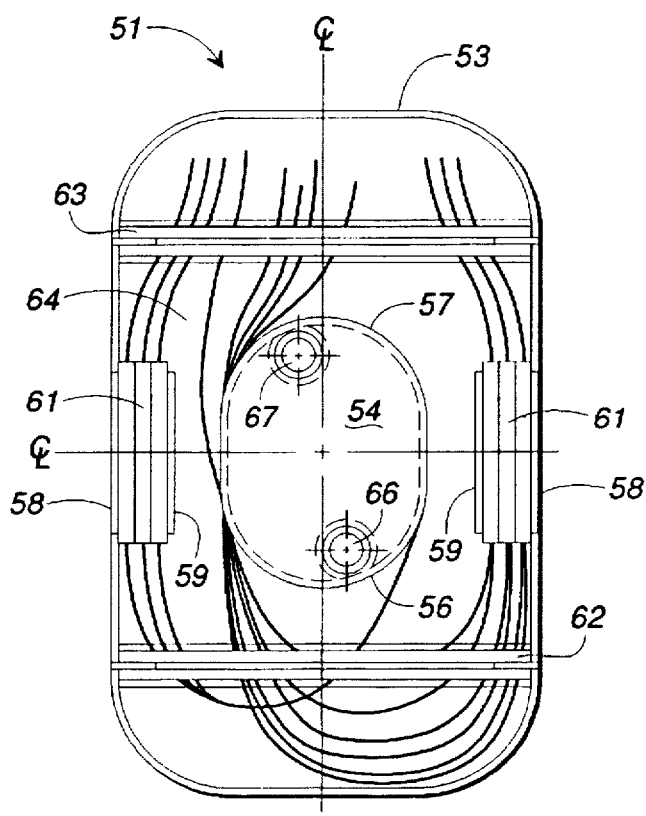
FIG. 5 is a plan view of the top side of the tray of the invention which shows how fibers may be routed and components stored in the organizer.
Figure 6:
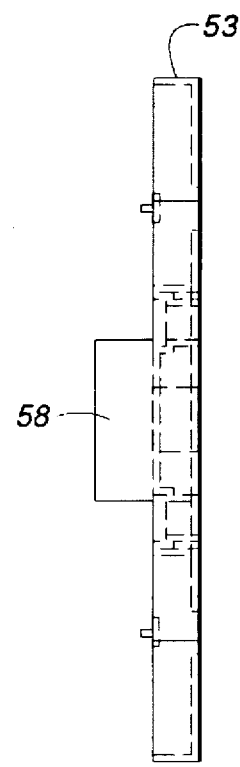
Figure 7:
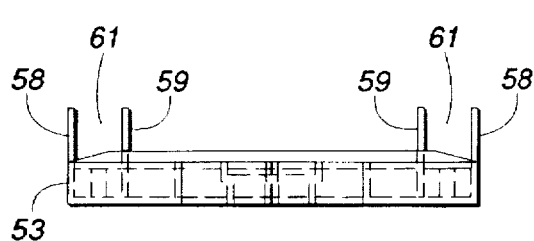
Figure 8:
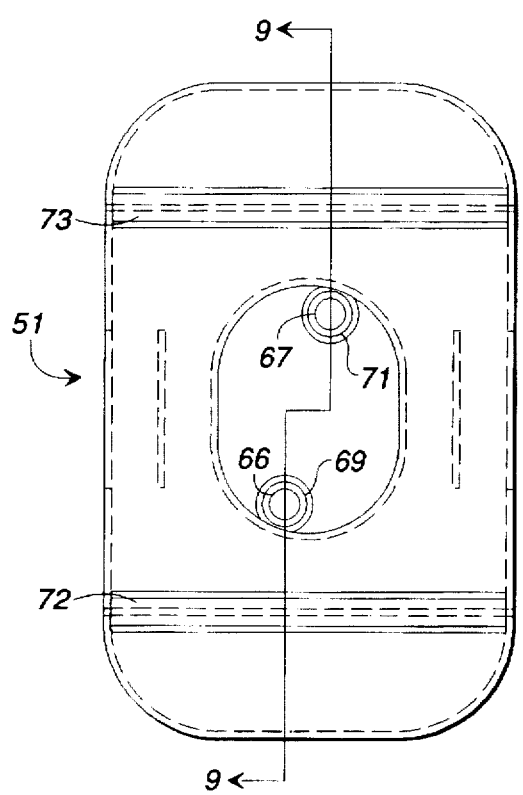

FIG. 6 is a side elevation view of the tray of FIG. 5;

FIG. 7 is an end elevation view of the tray of the invention;

FIG. 8 is a plan view of the bottom side of the tray of the invention; and

Figure 9:
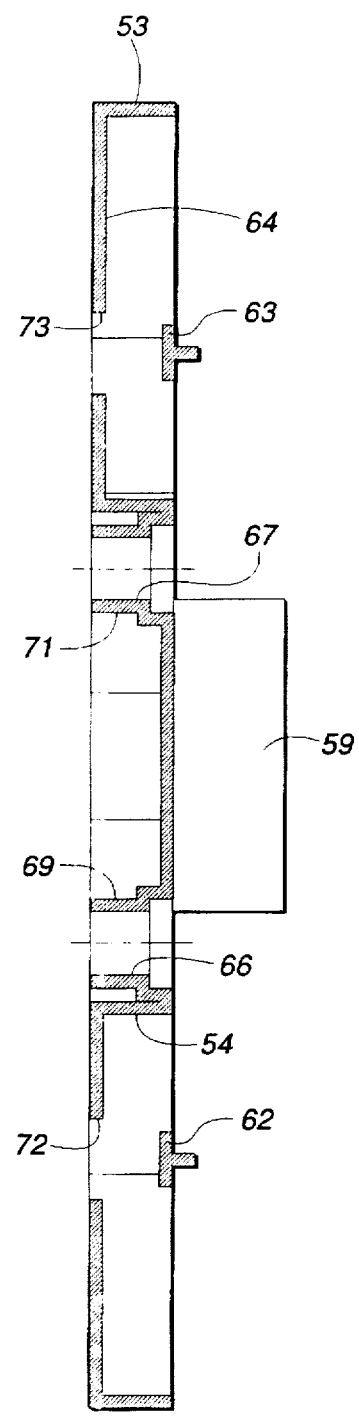

FIG. 9 is an enlarged cross-sectional view of the tray taken along the line A—A of FIG. 8.

DETAILED DESCRIPTION

Figure 1:
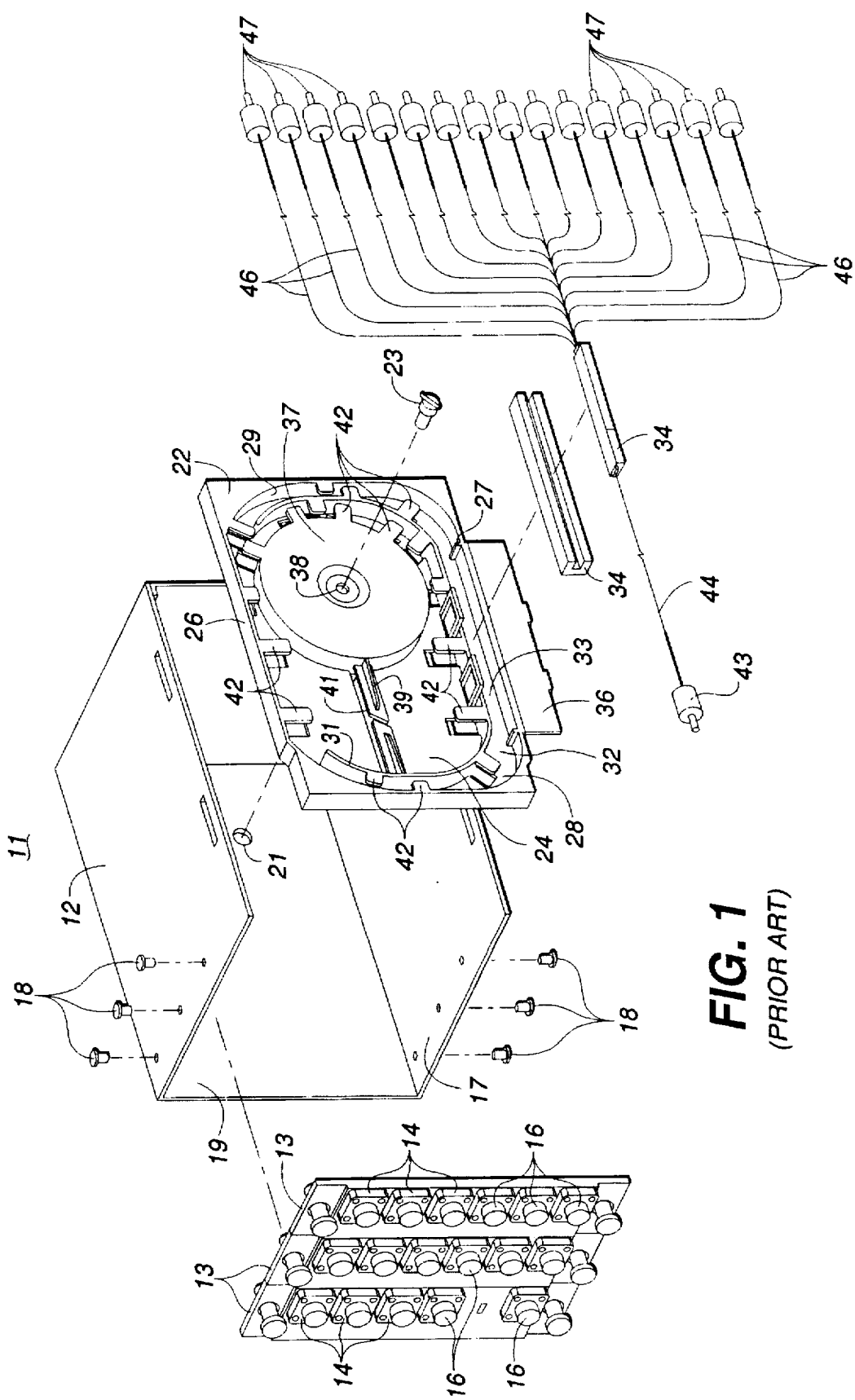
FIG. 1 is an exploded perspective view of a splitter module housing and a prior art organizing tray.

FIG. 1 depicts a typical prior art arrangement for containing splitter modules in a tray within a splitter module housing. The arrangement 11 comprises a rectangular box like housing 12 at one end of which are mounted three connector panels 13, each having a plurality, such as seven, connector ports 14 with connector buildout 16 mounted therein. Panels 13 are mounted on an open end 17 of the housing 12 by any suitable means such as screws 18. One wall or floor 19 of housing 12 has a mounting hole 21 in raised boss therein for mounting a fiber organizing tray 22 therein by any suitable means such as screw 23.

Figure 2:
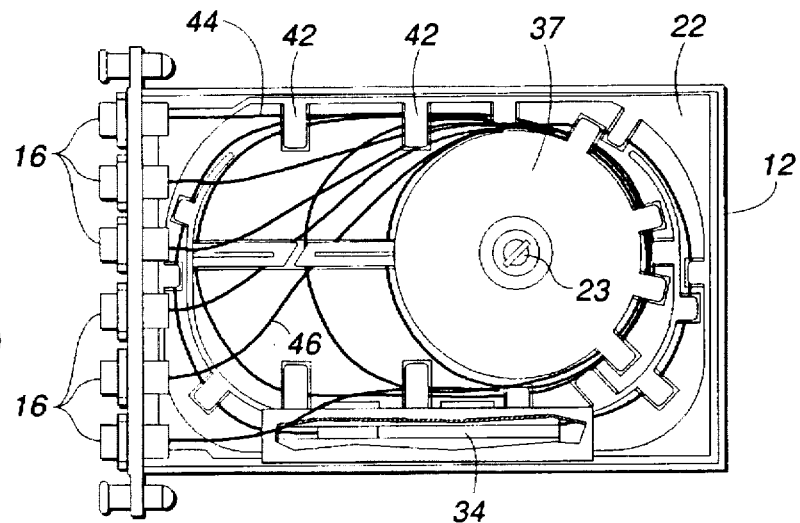
FIG. 2 is a plan view of the prior art organizing tray of FIG. 1 showing the fiber routing.

Tray 22 comprises a base member 24 having first and second upstanding side walls 26 and 27 and first and second interiorly curved end sections 28 and 29. A curved wall portion 31, spaced from the end sections 28 and 29 and side wall 27 forms a channel 32 for containing the optical fibers, as seen in FIG. 2, and also a section 33 for containing up to seven components (splicers or splitters) 34. A hinged lid 36 is used to cover the components 34 after they are in place and protect them from a second tray, not shown, to be stacked on top of tray 22. A circular hub member 37 is located near one end of tray 22, and has a radius that is greater than the critical radius so that fibers may be wound around the hub for accommodating the slack fibers contained within the tray 22. Hub 37 is provided with a mounting bore 38 through which headed mounting screw 23 passes to screw hole 21 for securing the tray 22 to the floor 19 of the housing 12. As can be seen in FIG. 1, hole 21 and bore 38 are both offset from the centerlines of both tray 22 and floor 19, so that tray 22 can only be inserted properly into housing 12 in one orientation only. Extending between hub 37 and curved wall 31 is a bar 39 having a gap 41 therein and which is spaced from the floor or bottom inside surface of base 24. Gap 41 facilitates the threading of individual fibers into the tray 22 and helps, to some extent, to hold them in place. A plurality of fingers or tabs 42,42 extend outwardly from the ends and side walls of tray 22, the wall 31, and hub 37 for containing the fibers within the tray 22. As pointed out hereinbefore, it is a tedious process to thread the fibers under the various tabs, a process which requires a serpentine configuration of each fiber to be threaded during the threading operation.

FIG. 1 also depicts a connector plug 43 which is to be connected to one of the connector buildouts 16 in one of the panels 13 and a fiber 44 leading therefrom to splitter 34. Exiting splitter 34 is a plurality of fibers 46,46, each terminating in a connector plug 47,47. The plugs 47,47 are connected to differing ones of the connector buildouts 16,16 in the panels 13. The splitter 34, fibers 44 and 46, and plugs 43 and 47 are shown here for illustrative purposes only. In particular, the number of fibers 46 and plugs 47 depends upon the type of splitter 34 to be used, and its capacity.

FIG. 2 illustrates a tray 22 mounted in housing 12 and shows the orientation and location of various ones of the fibers. No effort has been made to provide an exact assembly inasmuch as FIG. 2 is for illustrative purposes only.

Figure 3:
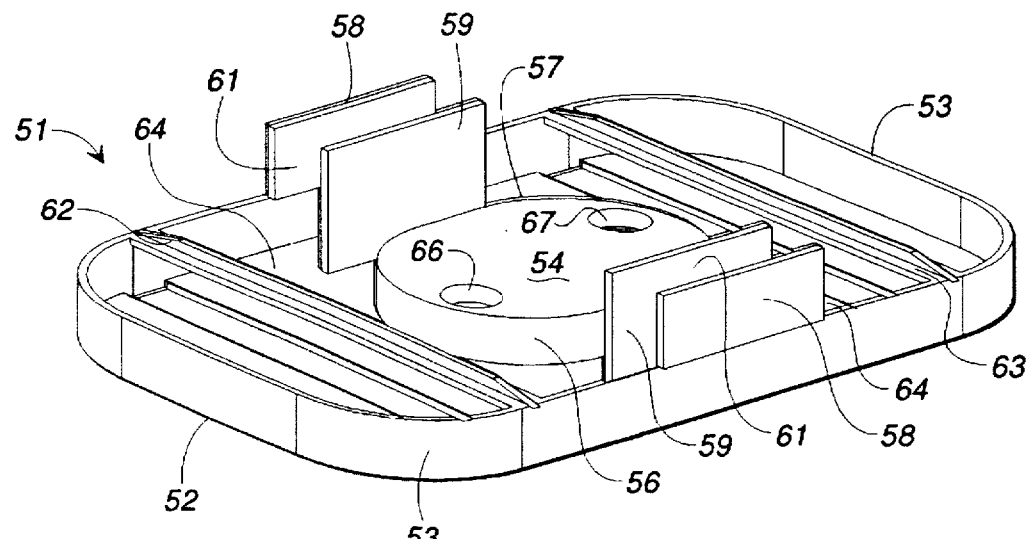
FIG. 3 is a perspective view of the upper or top side of the organizing tray of the invention.

FIG. 3 depicts, in perspective, the top view of the tray 51 embodying the principles and features of the present invention. Tray 51 comprises a base member 52 of suitable material, such as one of many polymers, having an upstanding wall 53 extending around the periphery thereof. Centrally located on base member 52 within the space defined by the wall 53 is an elongated hub 54 having rounded ends 56 and 57. The radius of curvature of ends 56 and 57 is greater than the aforementioned critical radius for optical fibers, hence any fiber wound about hub 54 will not be subjected to any stresses or strains attendant with a too sharp a curve or small radius. Approximately midway of the length of tray 51 on each side thereof are upstanding portions 58, 58 which are preferably continuations of wall 53, and spaced therefrom are walls 59, 59. The space 61 between each pair of walls 58, 59 is a storage or container space for holding one or more components, such as the splitter 34 of FIG. 1. Inasmuch as it is not intended that a plurality of trays 51 be stacked within the housing 12, walls 58 and 59 extend to a considerably greater height than the corresponding walls 27 and 31 of the prior art tray 22 depicted in FIGS. 1 and 2. In addition, it is not necessary that a cover or lid be provided for the spaces 59 and 61.

Inasmuch as the constraints which stacking placing on the size of the module storage space are eliminated to a large extent, large numbers of modules, such as, for example, thirty-two splitters, may be stored therein. Such a large number of components necessarily requires or involves a corresponding large number of fibers. With such a large number of fibers, the tabs or fingers 42 of the tray 12 of FIG. 1 would present a difficult and tedious routing of the fiber within the space defined by the walls 26, 27, and 31. In order that the fibers may be retained in the corresponding space of the tray 51, first and second keeper bars 62 and 63 extend across tray 51 from opposite sides thereof with their ends affixed to or integral with the peripheral wall 53, as shown. The bars 62 and 63 are each spaced from the floor 64 of tray 51 so that the fibers, either singly or in loops, may be slid thereunder and prevented from escaping. The bars negate the necessity of threading the fibers under the tabs or fingers characteristic of prior art trays such as that shown in FIG. 1, and, as can be appreciated, represent a simpler construction than that of the prior art trays. Each keeper bar 62 and 63 is located approximately mid-way between an end wall of the tray 51 and the module containing space 61. First and second mounting bores 66 and 67 are formed in hub 54 for receiving a mounting screw or bolt for attaching tray 51 to the floor 19 of housing 12, one of which is aligned with screw receiving hole 21, regardless of which end of the tray 51 is inserted into housing 12 first. Bores 66 and 67 lie on either side of the centerline of hub 54 and tray 51, as is best seen in FIG. 5 to accommodate the aforementioned offset of hole 21 in raised boss. Thus, regardless of which end is inserted first, one of the bores 66 or 67 will be aligned with hole 21, thereby materially simplifying assembly and mounting of tray 51 within a housing 12.

Figure 4:
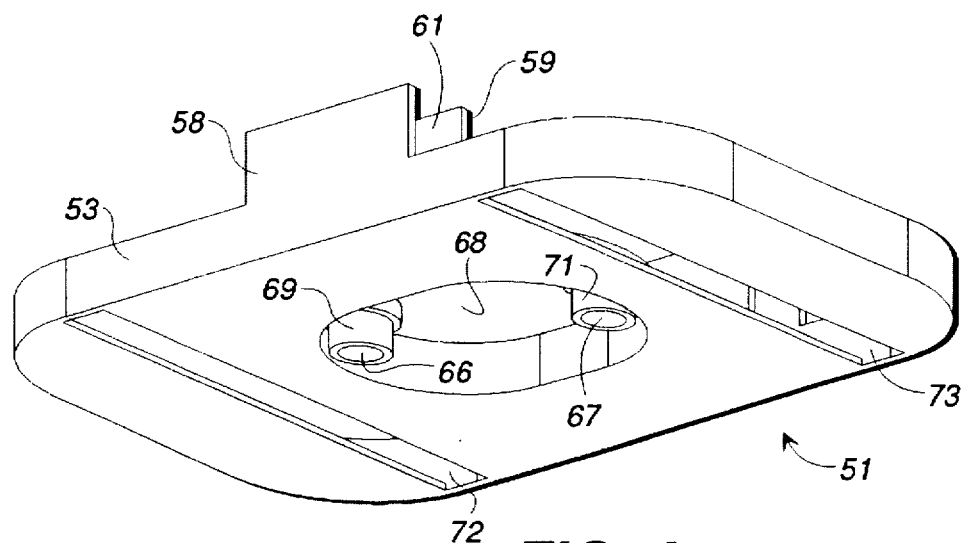
FIG. 4 is a perspective view of the bottom side of the tray of FIG. 3.

FIG. 4 shows, in perspective, the bottom or underside of tray 51. It can be seen that the interior of hub 54 is a hollow space 68 into and through which extend bosses 69 and 71 through which extend bores 66 and 67 respectively. The bosses add additional strength to the mounting means and insure proper containment of the mounting screw that passes therethrough. First and second open slots 72 and 73 in the floor 64 of tray 51 underlie keeper bars 62 and 63 respectively. Generally, these slots 72 and 73 result from the molding process during manufacture of tray 51, but serve the purpose of allowing observation, to some extent, of the fiber routing within the tray.

FIGS. 5, 6, and 7 are plan, side elevation, and end elevation views, respectively of tray 51, showing the location of the bores 66 and 67 relative to the centerline of the tray. As can be seen, tray 51 is symmetrical, i.e., the same on either side of the centerline and the same at each end. Thus the tray 51 is insertable into the housing from either end. Some routing paths for the fibers contained within the tray are shown, as are a plurality of splitters in each of the spaces 61.

FIG. 8 is a plan view of the bottom of tray 51, and FIG. 9 is an enlarged cross sectional view taken along the line A—A of FIG. 8. FIG. 9 in particular shows the configuration and location of the bosses 69 and 71, the keeper bars 62 and 63 and the slots 72 and 73.

The organizing tray of the invention as disclosed herein makes possible the storing of large numbers of components without the necessity of tray stacking, greatly simplifies the routing of optical fibers within the tray while retaining them in place, and, being symmetrical, facilitates installation of the tray within a housing.

In concluding the detailed description, it should be noted that it will be obvious to those skilled in the art that many variations and modifications may be made to the preferred embodiment without substantially departing from the principles of the present invention. All such variations and modifications are intended to be included herein as within the scope of the present invention. Further, in the claims hereafter the corresponding structures, materials, acts, and equivalents of all means of step-plus-function elements are intended to include any structure, material, or acts for performing the functions in combination with other claimed elements as specifically claimed.

I claim:

1. An optical fiber organizing tray for holding and protecting optical fibers typified by having a critical bend radius and modular components connected thereto, said tray comprising:

a base member having a substantially planar surface floor and first and second ends;

a peripheral wall having a first height extending around the periphery of said floor and defining a fiber containing space;

a hub member approximately centrally located on said floor, said hub member having at least a first curved portion whose radius of curvature is greater than the critical bend radius of the optical fibers;

a first pair of spaced upstanding walls having a second height on a first side of said hub member and spaced therefrom;

a second pair of spaced upstanding walls having a second height on a second side of said hub member opposite said first side and spaced therefrom;

each of said first and second pairs of walls defining a module containing space extending beyond the height of said peripheral wall;

said tray having a longitudinal centerline and being symmetrical relative thereto;

mounting means on said hub displayed from the longitudinal centerline of said tray; and wherein the second height is being greater than the height of the first height.

2. An optical fiber organizing tray as claimed in claim 1 and further including a first keeper bar extending across said tray from one side thereof to the other.

3. An optical fiber organizing tray as claimed in claim 2 and further including a second keeper bar extending across said tray from one side thereof to the other.

4. An optical fiber organizing tray as claimed in claim 3 wherein said first and second keeper bars are spaced from said floor of said base member.

5. An optical fiber organizing tray as claimed in claim 4 wherein each of said keeper bars are located between said hub and one end of said base member.

6. An optical fiber organizing tray as claimed in claim 1 wherein said mounting means comprises first and second bore in said hub spaced from each other said bores being offset from the longitudinal centerline on opposite sides thereof.

7. An optical fiber organizing tray for mounting in a splitter module protection enclosure, said tray comprising:

an elongated substantially planar floor member having first and second ends and first and second sides, said floor being symmetrical about a longitudinal center line and a transverse center line;

a peripheral wall member extending around the periphery of said floor member and extending to a first height above the plane thereof;

an elongated hub member approximately centrally located on said floor member having first and second sides, said hub having first and second radiused ends wherein the radius of curvature is greater than the critical bend radius of the optical fiber;

a first pair of spaced upstanding walls having a second height on the first side of said floor member and spaced from a side of said hub member;

a second pair of spaced upstanding walls having a second height on the second side of said floor member and spaced from the second side of said hub member, the second height of said first pair of spaced walls and of said second pair of spaced walls being greater than the height of said peripheral wall member;

a first keeper bar extending from said peripheral wall member on the first side of said floor member to said peripheral wall member on the second side of said floor member;

said first and second keeper bars being affixed to said peripheral wall member and spaced from said floor member; and means in said hub member for mounting said tray to the splitter module protection enclosure.

8. An optical fiber organizing tray as claimed in claim 7 wherein said means for mounting comprises a first bore in said hub member located on one side of the longitudinal centerline and spaced therefrom and spaced from the transverse centerline and a second bore in said hub member located on the other side of the longitudinal centerline from said first bore and spaced therefrom and located on the opposite side of the transverse centerline from said first bore and spaced therefrom.

9. An optical fiber organizing tray as claimed in claim 8 wherein said first and second bores are spaced equidistantly from the longitudinal centerline.

10. An optical fiber organizing tray as claimed in claim 9 wherein said first and second bores are spaced equidistantly from the transverse centerline.

11. An optical fiber organizing tray as claimed in claim 8 wherein said hub member has a hollow space on the underside thereof and each of said bores extends through a boss extending in said hollow space.

12. An optical fiber organizing tray as claimed in claim 8 wherein said floor member has first and second transversely extending slots therein.

13. An optical fiber organizing tray as claimed in claim 12 wherein each of said slots underlies one of said keeper bars.

14. An optical fiber organizing tray as claimed in claim 13 wherein each of said slots is substantially coextensive with its corresponding keeper bar.

* * * * *